United States Patent [19]

Yamazaki

[11] 4,126,896
[45] Nov. 21, 1978

[54] MICROPROGRAMMED LARGE-SCALE INTEGRATION (LSI) MICROPROCESSOR

[75] Inventor: Isamu Yamazaki, Yokohama, Japan

[73] Assignee: Tokyo Shibaura Electric Co., Ltd., Kawasaki, Japan

[21] Appl. No.: 783,637

[22] Filed: Apr. 1, 1977

[30] Foreign Application Priority Data

Apr. 1, 1976 [JP] Japan .................................. 51-35188

[51] Int. Cl.$^2$ ................................................ G06F 9/16
[52] U.S. Cl. .................................................... 364/200
[58] Field of Search ... 364/200 MS File, 900 MS File

[56] References Cited

U.S. PATENT DOCUMENTS

| 3,391,394 | 7/1968 | Ottaway et al. ...................... 364/200 |
| 3,958,221 | 5/1976 | Serra et al. ........................... 364/200 |
| 4,004,281 | 1/1977 | Bennett et al. ........................ 364/200 |

*Primary Examiner*—Joseph M. Thesz
*Attorney, Agent, or Firm*—Oblon, Fisher, Spivak, McClelland & Maier

[57] ABSTRACT

A microprogrammed LSI microprocessor comprises a read only memory (ROM) for storing therein microprograms and a decode table for the operation code of macroinstructions, and an arithmetic logic control section constructed into a one package of LSI circuit. The arithmetic logic control section is constructed into a circuit arrangement which, on the assumption that the operation code of macroinstructions be an address, sets the starting address of a corresponding macroinstruction read from the ROM in a location counter, reads from the ROM a microinstruction corresponding to the starting address set in the location counter to set this microinstruction in a microinstruction register, and arithmetically executes the microinstruction stored in the microinstruction register.

6 Claims, 3 Drawing Figures

MICROPROGRAMMED LARGE-SCALE INTEGRATION (LSI) MICROPROCESSOR

BACKGROUND OF THE INVENTION

This invention relates to a microprogrammed microprocessor, and more particularly to a microprocessor formed into a large scale integration (LSI) controlled in accordance with the microprogram.

A known microprogram control method is widely adopted as the computer control method. In the microprogrammed computer, the microinstruction which can replace an instruction of machine languages is executed in accordance with the microprogram provided correspondingly to each macroinstruction. The microprogram is sequentially arranged with a plurality of microinstructions. This is portion of microprogram is called a "microroutine". The microinstructions are each given a corresponding operation code and are discriminated from each other in accordance with the respective operation codes. Each time the computer executes the macroinstruction, determination is made of the starting address of a specified microroutine corresponding to the operation code of the macroinstruction, whereby the operation of branching the macroinstruction operation into the starting address is performed. Since, in this case, a decode table for the correspondence between the operation code and the starting address of the microroutine is necessary, a memory (DROM) for storing the decode table therein is provided. Further, a memory (ROM) is provided which stores therein the microroutines each allocated in the corresponding starting address read out from the decode table. Further, an arithemetic logic control section is provided which control, the operation between DROM and ROM and executes the microroutine. A detailed explanation of the microprogrammed processor having DROM and ROM is disclosed in U.S. Pat. No. 3,646,522. However, where such microprogrammed processor as mentioned above is formed into LSI, the arithmetic logic control section is usually formed into one package and is connected to DROM and to ROM through buses, respectively. In this case in particular, a pair of bus units each consisting of address bus and data bus are necessary between DROM and the arithmetic logic control section and between ROM and the latter, respectively. Accordingly, a large number of input/output pins utilizing for the buses are required for the LSI package of arithmetic logic control section. Provision of such large number of input/output pins on the LSI package not only causes an increase in the package cost and bonding cost, but also causes an enlargement in size of the package in the actual formation of the control section into LSI, resulting in that the package occupies a large area on the print circuit, thus to cause a decrease in the merit of forming control section into LSI.

SUMMARY OF THE INVENTION

An object of the invention is to provide a microprogrammed LSI microprocessor which, in the case of forming the arithmetic logic control section into LSI, permits a large reduction in number of the input/output pins.

Another object of the invention is to provide a microprogrammed LSI microprocessor which is simple in circuit construction and permits a flexible utilization of the computer system.

According to a preferred embodiment of the invention, a microprogrammed LSI microprocessor comprises an instruction register for storing therein at least an operation code of macroinstruction, memory means for storing therein a decode table for the operation code of macroinstruction and microprograms, a location counter for storing therein the address of a microinstruction to be executed following next, a microinstruction register for storing therein a microinstruction read out from the memory means, a decode means for decoding the microinstruction stored in the microinstruction register, an arithmetic logic unit for executing the microinstruction stored in the microinstruction register, a first means for setting to the location counter, assuming that the operation code of the memory means be an address and referring to the decode table stored in the memory means, the starting address of the microprogram corresponding to the macroinstruction, read out from the memory means and a second means for, assuming that the content of the location counter be an address and referring to the microprogram stored in the memory means, reading a predetermined microinstruction corresponding to the macroinstruction from the memory and setting it to the microinstruction register.

One of the principal features is to reduce the number of input/output signal lines between the arithmetic logic control section and the memory by communizing the address space between the decode table memory and microprogram memory.

Other features and advantages of the invention will further be concretely understood from the rest of the specification.

DETAILED DESCRIPTION OF PREFERRED EMBODIMENTS

Figure 1:
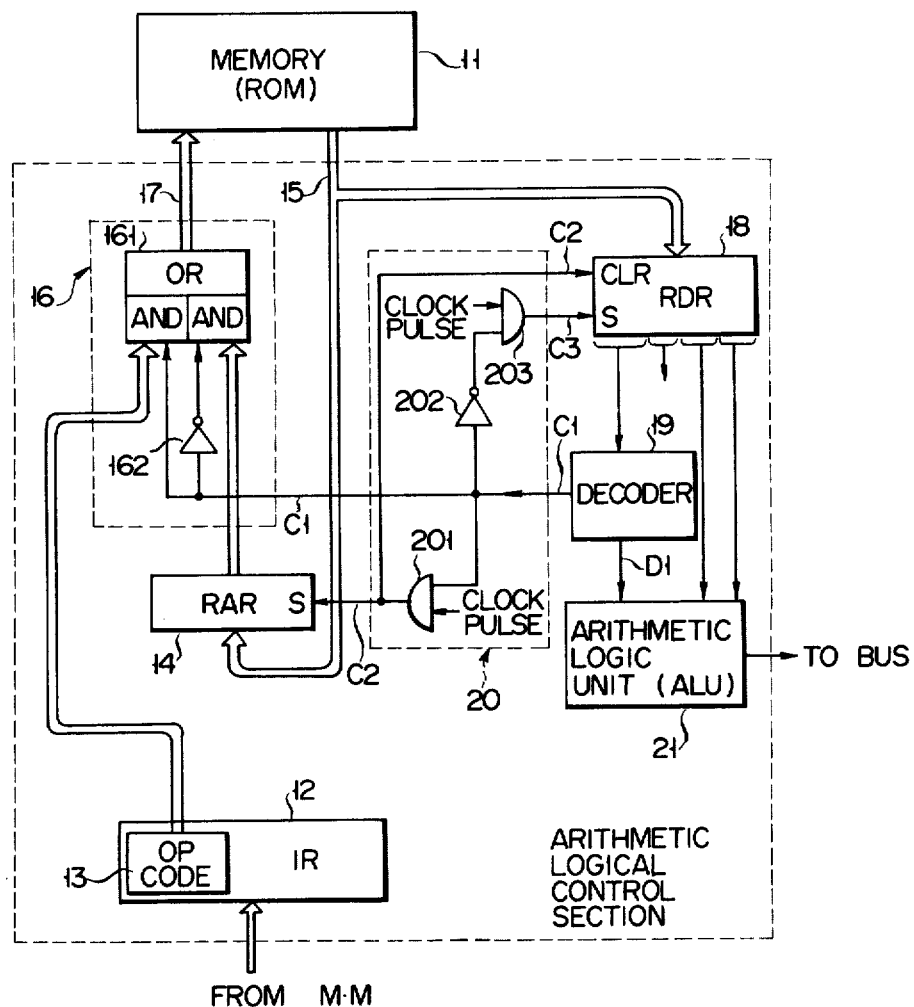
FIG. 1 is a systematic block diagram of a microprogrammed LSI processor according to the invention.

FIG. 1 shows a microprogrammed LSI microprocessor according to an embodiment of the invention. A memory 11 is a read only memory (ROM) for storing therein microprograms and a decode table. The memory 11 is stored with such microprograms and decode table contents as shown in, for example, Table 1 below.

Table 1

| | Address | Data | Label | Contents |
|---|---|---|---|---|
| DECODE TABLE | 000 | 3B5 | NOP | DC NOPST |
| | 001 | 301 | AND | DC ANDST |
| | 002 | 306 | IOR | DC IORST |
| | 003 | 30B | XOR | DC XORST |
| | 004 | 351 | ADD | DC ADDST |
| | 005 | 36A | SUB | DC SUBST |
| | 006 | 313 | INC | DC INCST |
| | 007 | 319 | DEC | DC DECST |
| | 008 | 392 | LOAD | DC LOADST |
| | 009 | 386 | STORE | DC STORST |
| | 00A | 422 | MOVE | DC MOVEST |
| | 00B | 432 | HALT | DC |
| | ... | . | . | . |
| | ... | . | . | . |
| | ... | . | . | . |
| | OFF | | | |
| | 100 | . | . | . |
| | 101 | | | |
| | 102 | . | . | . |
| | 103 | | | |

| | Table 1-continued | | |
|---|---|---|---|
| | Address | Data Label | Contents |
| MICRO PROGRAM | . . . 351 . . . 36A . . . 386 . . . 392 . . . 3B5 . . . FFF | ___ ADDST ___ SUBST ___ STOREST ___ LOADST ___ NOPST | _____ _____ _____ _____ _____ |

The address space of the memory 11 is stored with the decode table over "256" words corresponding to the hexadecimally indicated addresses "000" to "OFF", respectively, and with the microprograms at the address "100" to "OFF". The "ADDRESS" shown in Table 1 represents the addresses in the memory as hexadecimally indicated. Namely, the memory 11 has the address "000" to "FFF" allocated therein. In the decode table, the "ADDRESS" represents the operation code of macroinstructions. Accordingly, the "LABEL" represents the mnemonic code of corresponding macroinstructions, and the "CONTENTS" represent the label of the starting address, within the microprogram, of a "microroutine" of the said corresponding macroinstructions, and the corresponding "DATA" represents the starting address of the "microroutine". For example, the "microroutine" of a LOAD macroinstruction whose operation code is "08" is sequentrally stored in the same memory 11 from the starting address "392". Accordingly, in a manner corresponding to the address "008" within the memory 11, the starting address "392" of the LOAD macroinstruction is written at the column "DATA".

An instruction register 12 is a register for storing macroinstructions, and stores therein at least an operation code field 13 of macroinstruction. In this embodiment, the operation code has allotted thereto "256" words corresponding respectively to the address of the decode table side of the memory 11 shown in Table 1 above. A ROM address register 14 is a location counter for storing therein the addresses of microinstructions read out from the memory 11 through a data bus 15. A selection circuit 16 is designed to select either one of the following two types of information; one is the operation code field 13 information stored in the instruction register 12 and the other is the address information stored in the address register RAR 14. This selection circuit 16 includes a conventional combination circuit of AND-OR 161 and an inverter 162 as later described for inverting control signals. The information selected by the selection circuit 16 designates a specified address of the memory 11 through an address bus 17.

A ROM data register RDR 18 is a microinstruction register for storing, with a timing with which a set pulse is applied to a set terminal S, a microinstruction to be executed which has been read out from the memory 11. Of the microinstruction stored in the register RDR 18, for example, a 4-bits operation code field is decoded by a decoder 19 and this decoder 19 produces a specified decode signal. Where the microinstruction stored in the register RDR 18 is a decode instruction, the decoder 19 produces a control signal C1 having a logical level of "1". Further, where the microinstruction stored in the register RDR 18 is other than the decode instruction, the decoder 19 produces a decode signal D1. Where the control signal C1 has a logical level of "1" during the fetch cycle of the macroinstruction, that is, the microinstruction is a decode microinstruction, a control circuit 20 first prevents the contents read out from the memory 11 through the data bus 15 from being set in the register RDR 18, secondly controls the operation of permitting those contents of the memory 11 to be set in the address register RAR 14, and thirdly controls the instructing operation of the selection circuit 16 as to which of the contents of the instruction register 12 and those of the address register RAR 14 should be selected. The control circuit 20 includes a first AND gate 201 for deriving a logical product between the control signal C1 and a clock pulse, and a second AND gate for deriving a logical product between the output of an inverter 202 for inverting the control signal C1 and a clock pulse. The first control signal C1 is applied to the selection circuit 16, a control signal C2 from the first AND gate 201 to a set terminal S of the RAR 16 and to a clear terminal CLR of the RDR 18, and a control signal C3 from the second AND gate 203 to a set terminal S of the register 18, respectively.

The RDR 18 is stored with a decode microinstruction. When the decoder 19 detects the same to produce a control signal C1 having a logical level of "1", the control signal C2 has a logical level of "1" with a timing with which a clock pulse is applied to the first AND gate 201. Production of the control signal C2 having a logical level of "1" causes the starting address of the execution routine of a microprogram read out from the ROM memory 11 to be set in the address register RAR 14 and simultaneously causes the clearing of the decode microinstruction stored in the register RDR. As a result, during the operation cycle of the macroinstruction no operation is executed.

Note that the said clock pulse is a signal sent from a not shown pulse generator and functions as a timing signal for making same the timings with which the above-mentioned two operations are controlled. An arithmetic logic unit (ALU) 21 is a well known circuit for subjecting the microinstruction stored in the register RDR 18 to arithmetic operation execution and includes an operation logic circuit, register file etc. The ALU 21 receives a decode signal D1 from the decoder 19 and simultaneously performs various arithmetic operation in accordance with the information from the register RDR 18.

Figure 2:
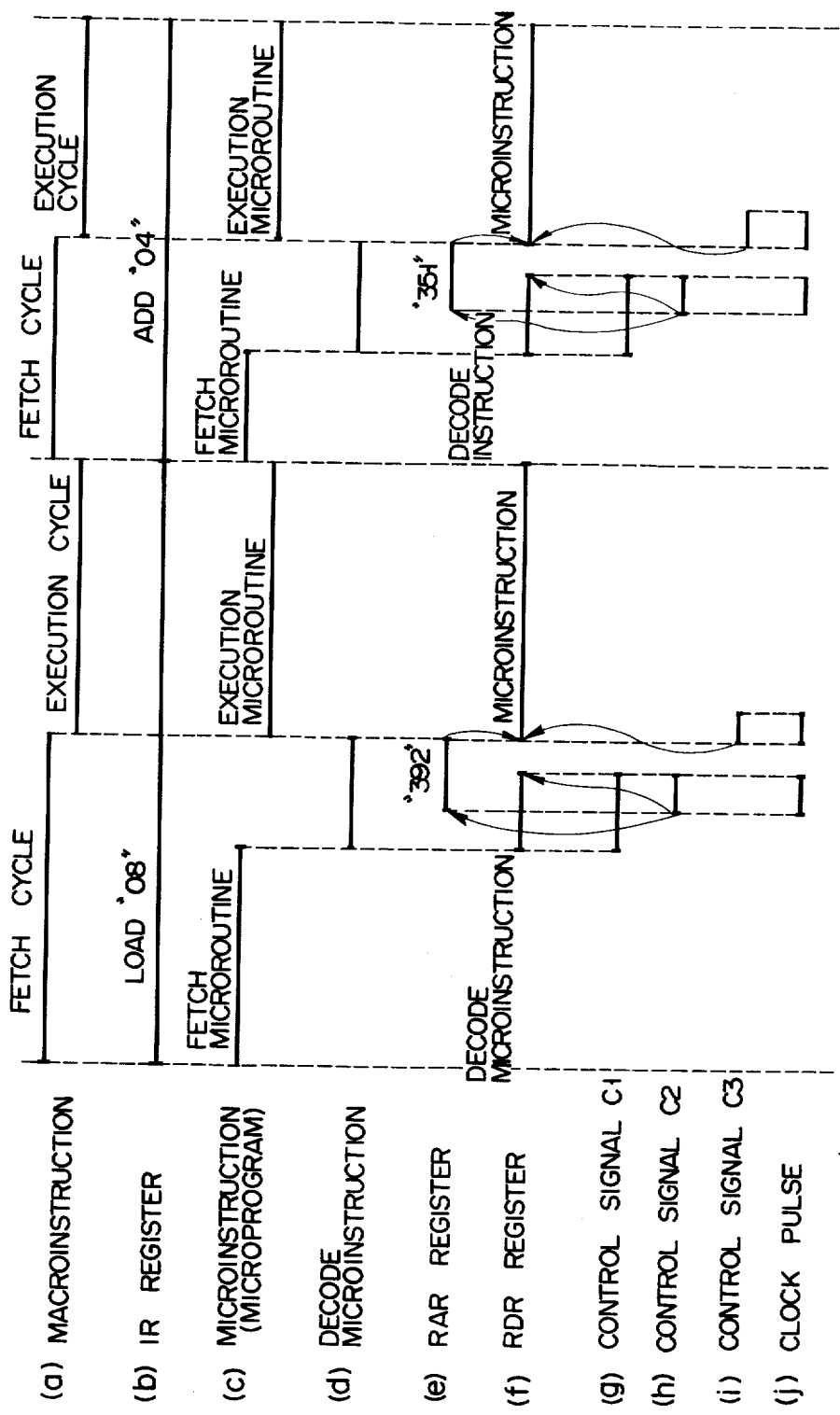
FIG. 2 is a time chart for explaining the operation of the processor shown in FIG. 1.

FIG. 2 is an operation time chart of the system shown in FIG. 1. The program using macroinstructions is executed with an alternate repetition of the instruction fetch cycle and execution cycle, as shown in FIG. 2(a). According to the invention, this instruction fetch cycle of macroinstructions is executed in accordance with the instruction fetch routine of a microprogram, while the execution cycle is executed in accordance with the execution routine of a microprogram, as shown in FIG. 2(c). Namely, according to the invention, the fetch routine is also stored in the memory 11 and the fetch routine and execution routine are alternately executed. Further, at the final stage of the fetch routine the decode microinstruction is executed necessarily, as shown in FIG. 2(d). This is due to the omission of the decode ROM as of the characterizing feature of the invention.

Assume now that a macroinstruction to be next executed which has been read out in accordance with the fetch routine have been fed from a main memory (M.M) to the instruction register IR 12. Assume further that this macroinstruction be a LOAD instruction as shown in FIG. 2(b) and that an instruction code of "08" be stored in the operation code field 13. Then, at the final stage of the fetch routine the decode microinstruction is executed as shown in FIG. 2(d). Accordingly, the decode microinstruction is previously stored in the register RDR 18 as shown in FIG. 2(f). Since this decode microinstruction is decoded by the decoder 19, the decoder 19 produces a control signal C1 having a logical level of "1" as shown in FIG. 2(g). When the control circuit 20 receives this control signal C1 having a level of "1" with a timing with which it receives a clock pulse (FIG. 2j), it produces from its first AND gate 201 a control signal C2 having a logical level of "1" as shown in FIG. 2(h). At this time, the logical level of the control signal C3 produced from the second AND gate 203 is "0" as shown in FIG. 2(i). Since the logical level of the control signal C1 is "1", the selection circuit 16 selects the operation code "08" of the instruction register IR 12 and feeds this code information "08" to the memory 11 through the address bus 17, and causes a readout, from the memory 11, of the contents "392" at the address "008" as shown in Table 1 which corresponds to the operation code. The data "392" read out from the memory 11 is set in the address register RAR 14 through the data bus 15 in accordance with the control signal C2 (FIG. 2h), as shown in FIG. 2(e). The reason is as follows. Since the control signal C3 has a logical level of "0", the data "392" is not set in the register RDR 18. Accordingly, the address register RAR 14 is stored with the starting address "392" of the execution routine of a macroinstruction "LOAD" as shown in Table 1. At this time, the decode microinstruction stored in the RDR 18 is cleared in accordance with the control signal C2 as shown in FIG. 2(f). Thereafter, the system of FIG. 1 executes the microprogram in accordance with the execution routine shown in FIG. 2(c) as in the conventional microprogram operation. That is, when the execution of the decode microinstruction is completed as shown in FIG. 2(d), the control signal C1 is not produced, as shown in FIG. 2(g) (namely, the signal C1 becomes a logical level of "0"). Accordingly, in the control circuit 20, the control signal C2 has a logical level of "0", and the control signal C3 has a logical level of "1" with a timing with which it is applied with the clock pulse, as shown in FIG. 2(i). Since the control signal C1 has a logical level of "0", the selection circuit 16 supplies the contents "392" of the address register RAR 14 to the memory 11 through the address bus 17. Since the control signal C3 has a logical level of "1", the data (microinstruction) read out from the address "392" of the memory 11 is set in the register RDR 18 through the data bus 15 as shown in FIG. 2(f). The microinstruction stored in the register RDR 18 is decoded by the decoder 19 and further is subject to arithmetic operation execution by the ALU 21.

Upon completion of an execution routine corresponding to the macroinstruction "LOAD", the fetch routine is again executed as shown in FIG. 2(c) and the next macroinstruction, for example, as ADD instruction "04", is supplied to the instruction register IR 12. Thus, the macroprogram is executed as in the above-mentioned macroprogram execution.

Figure 3:
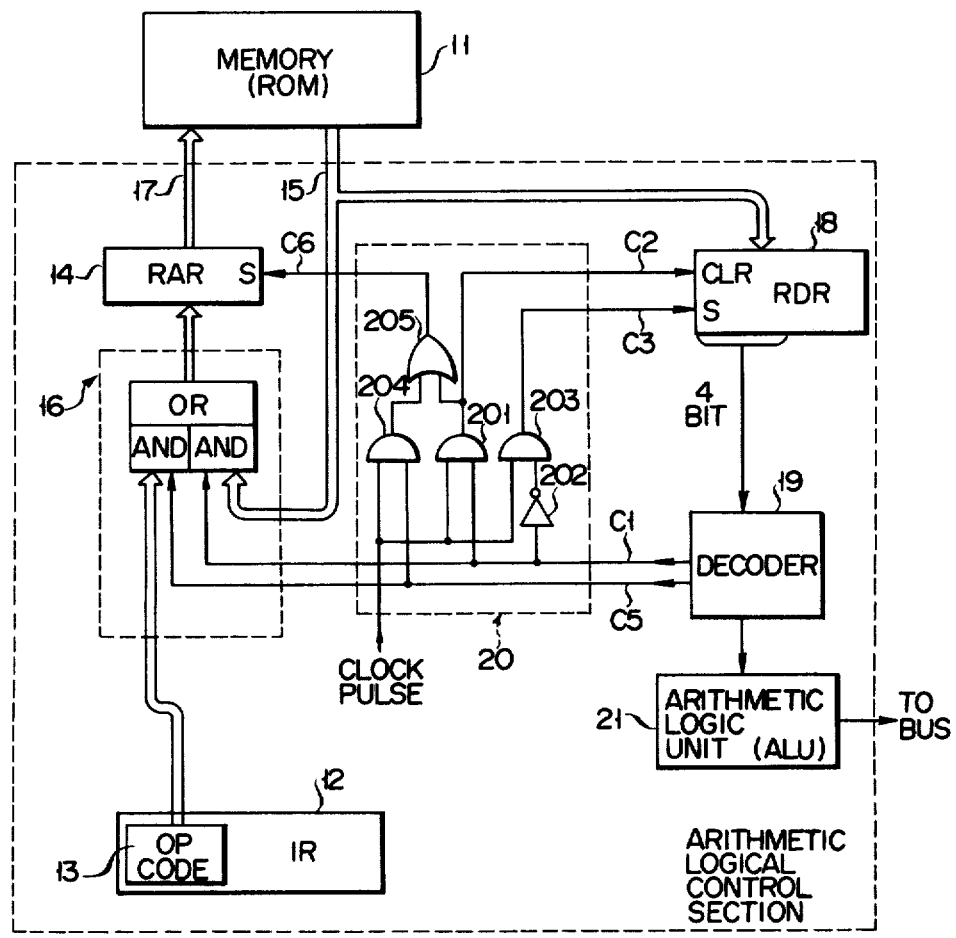
FIG. 3 is a systematic block diagram of a modification of the processor of the invention.

FIG. 3 shows a modified circuit arrangement of the microprogrammed LSI processor according to the invention.

In this circuit arrangement, the address register RAR 14 is provided on the output side of the selection circuit 16, and is so constructed that the contents of the operation code field 13 is once stored in the address register RAR 14 and the contents thereof is newly used as an address. Further, two machine cycles are necessary to send the contents of the operation code field 13 to the register RAR 14, and looking up the table of the ROM 11 is accordance with the contents (address) of the register RAR 14 to set the starting address of a microroutine to the address register RAR 14. In the circuit arrangement, therefore, the decode instructions are classified into two types, one of which consists of DEC 1 microinstructions and the other of which consists of DEC 2 microinstructions, said both types of instructions being arranged to have their respective peculiar functions. In case of the DEC 1 instructions, a new type of control signal C5 having a logical level of "1" is produced from the deocder 19. In accordance with the control signal C5, the selection circuit 16 selects the contents of the operation code field 13 of the instruction register IR 12 to supply it to the address register RAR 14. The control circuit 20 is so constructed that, in order that even upon production of the control signal C5 from the decoder 19 the infromation of the operation code field 13 may be set in the address register RAR 14, the output of the AND gate 204 is applied to a set terminal S of the RAR 14 through an OR gate 205. The control signal C5 from the OR gate 205, therefore, serves as functions as a set pulse for causing operation of the RAR 14. Accordingly, the contents of the operation code field 13 is set in the register 14 in accordance with a control signal C6. At this time, the data register RDR 18 is set with an decode microinstruction (DEC 2 instruction) to be next executed which has been read out from the ROM 11. In case of DEC 2 microinstructions, the control signal C1 is produced from the decoder 19. In accordance with the control signal C1, the starting address of the microroutine read out from the ROM 11 in accordance with the address information of the RAR 14 is set in the register 14 through the bus 15 and selection circuit 16. Since, at this time, the register RDR 18 is cleared, the ALU 21 is brought into a state of "no operation".

According to the invention, the arithmetic logic control section enclosed by a broken line is formed into one package of LSI. Therefore, the number of input/output signal lines for this section is largely decreased. Therefore, the cost of forming the section into LSI is reduced, and the efficiency of actually forming the section into LSI is increased and simultaneously the operation of such actual formation is simplified. Further, according to the invention, the decode table and microprogram can be stored into one memory, and the resulting circuit construction can be made simple. Generally, the storage capacity of the decode table is determined depending upon the bit number of the operation code field of the macroinstruction. According to the invention, however, the boundary between the address of the decode table and the address of the microprogram may simply be altered or changed, whereby a flexible utilization of the system is possible.

What is claimed is:

1. A microprogrammed LSI microprocessor comprising:

an instruction register for storing at least an operation code field of a macroinstruction;

memory means constituted by a first memory section for storing the contents of a decode table in which are located addresses corresponding to the operation code field read out from the instruction register and a second memory section for storing the contents of microprograms;

a data bus;

an address bus;

a location counter connected to the second memory section of the memory means by means of the data bus for storing the contents of the starting address of a microprogram to be executed and read out from the second memory section in accordance with the decode table stored in the first memory section and for transferring the contents of said starting address to the memory means through the address bus, said operation code field from the instruction register being used to designate said starting address;

a microinstruction register connected to the second memory section by means of the data bus for storing a microinstruction read out from the second memory section, said microinstruction having been designated by the contents of the starting address read out from the location counter;

decoder means for decoding a microinstruction read out from the microinstruction register;

an arithmetic logic unit connected to the microinstruction register for executing a microinstruction read out therefrom;

a data selection control circuit connected by means of the address bus between the memory means and the instruction register and between the memory means and the location counter for selectively supplying to the memory means the operation code field from the instruction register or the starting address data of microinstructions from the location counter according to whether the decoder means generates a control signal; and a control signal generating circuit connected to the decoder means, the location counter and the microinstruction register and responsive to a control signal from said decoder means for preventing the contents of the starting address of the microprogram read out from the memory means from being stored into the microinstruction register through the data bus and for supplying a set signal so as to store the contents of the starting address into the location counter and at the same time supplying a signal so as to clear the microinstruction register.

2. A microprogrammed LSI microprocessor according to claim 1, wherein said data selection control circuit includes:

an inverter for inverting a control signal from said decoder means and an AND/OR circuit connected to the inverter so as to select the operation code field or the starting address data according to the logic level of a control signal from the control signal generating circuit.

3. A microprogrammed LSI microprocessor according to claim 1, wherein said control signal generating circuit includes:

a first AND circuit connected to the decoder means, the location counter and the microinstruction register and responsive to a control signal from the decoder means and a clock pulse for generating a set signal to the location counter and a clear instructing signal to the microinstruction register, an inverter connected to the decoder means for inverting the control signal from the decoder means, and a second AND circuit connected to the inverter and the microinstruction register and responsive to an output of the inverter and the clock pulse for generating a set signal to the microinstruction register.

4. A microprogrammed LSI microprocessor according to claim 1, wherein said control signal generating circuit includes:

a first AND circuit connected to the decoder means, the location counter and the microinstruction register and responsive to a first control signal from the decoder means and a clock pulse for generating a set signal to the location counter and a clear instruction signal to the microinstruction register, an inverter connected to the decoder means for inverting the first control signal from the decoder means, a second AND circuit connected to the inverter and the microinstruction register and responsive to an output of the inverter and the clock pulse for generating a set signal to the microinstruction register, a third AND circuit connected to the decoder means and responsive to a second signal from the decoder means, and an OR circuit connected to the third AND circuit, the first AND circuit and the location counter and responsive to an output of said third AND circuit and an output of said first AND circuit for generating a set signal to the location counter, said set signal being the logical sum of the outputs of the first and third AND circuits.

5. A microprogrammed LSI microprocessor according to claim 1, wherein: said decoder means generates a control signal when the microinstruction stored in the microinstruction register is a decode microinstruction.

6. A microprogrammed LSI microprocessor according to claim 1, wherein said instruction register, location counter, data selection control circuit, microinstruction register, decoder means, arithmetic logic counter and control signal generating circuit are in the form of a single LSI package, and said memory means is connected to the LSI package by means of said address bus and data bus.

* * * * *